United States Patent [19]
Lutz et al.

[11] 3,929,009
[45] Dec. 30, 1975

[54] MEASUREMENT OF DRILLING TORQUE

[75] Inventors: Jean Lutz, Pau; Andre Traille, Aussevielle; Francois Besnard, Lescar, all of France

[73] Assignee: Societe Nationale des Petroles d'Aquitaine, Paris, France

[22] Filed: June 18, 1973

[21] Appl. No.: 370,677

[30] Foreign Application Priority Data
June 20, 1972 France .............................. 72.22150

[52] U.S. Cl. .............................................. 73/136 A
[51] Int. Cl. .............................................. G01l 3/10
[58] Field of Search ............. 73/88.5 R, 136 A, 151

[56] References Cited
UNITED STATES PATENTS

| | | | |
|---|---|---|---|
| 2,400,170 | 5/1946 | Silverman ...................... | 73/151 UX |
| 2,422,806 | 6/1947 | Silverman et al. ............... | 73/DIG. 4 |
| 3,686,942 | 8/1972 | Chatard et al. .................. | 73/88.5 X |
| 3,691,825 | 9/1972 | Dyer .................................. | 73/136 A |
| 3,696,332 | 10/1972 | Dickson, Jr. ..................... | 73/151 X |

*Primary Examiner*—Charles A. Ruehl
*Attorney, Agent, or Firm*—Brisebois & Kruger

[57] ABSTRACT

This invention concerns the direct, continuous measurement of drilling torque.

The main technical features of the invention are the fixing of orthogonal pairs of strain gauges inside symmetrical cavities provided on the cylindrical bottom section of the Kelly, hermetic closure of these cavities by means of steel plugs which do not project beyond them, and the provision of passages for electric cables, protected against any impact or contact with the drilling mud.

The main application is in the measurement of torque on the Kelly of a drilling system, or any transmission shaft in similar circumstances, namely subject to transverse impacts, and immersed continuously or intermittently in a corrosive liquid.

7 Claims, 7 Drawing Figures

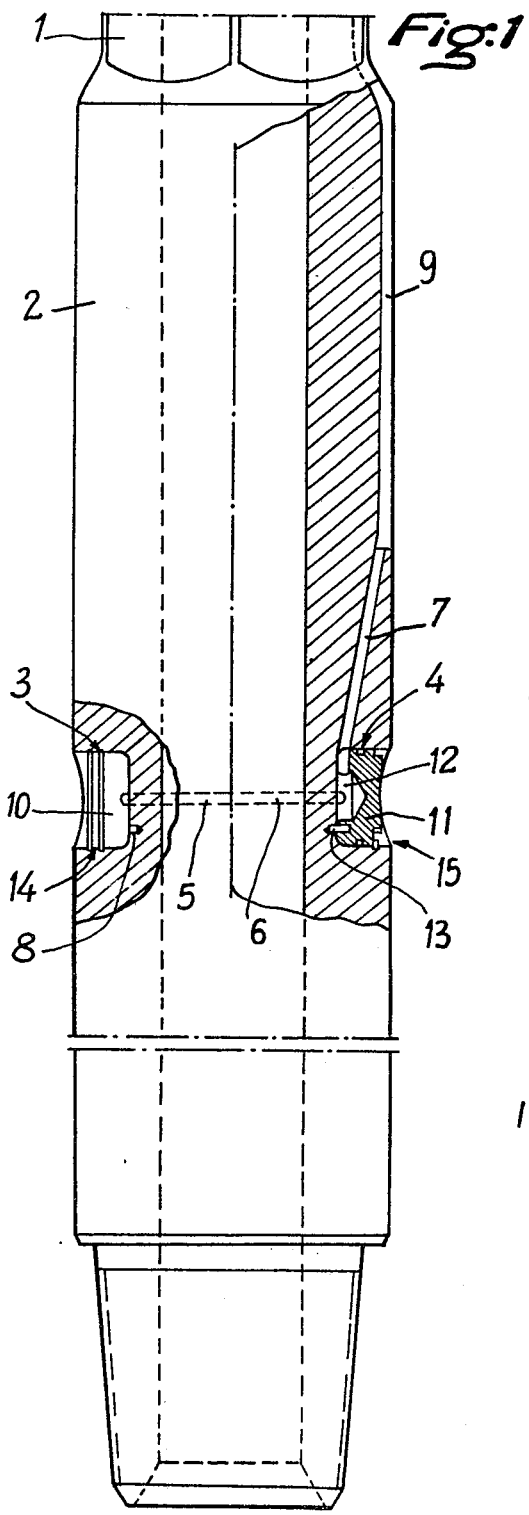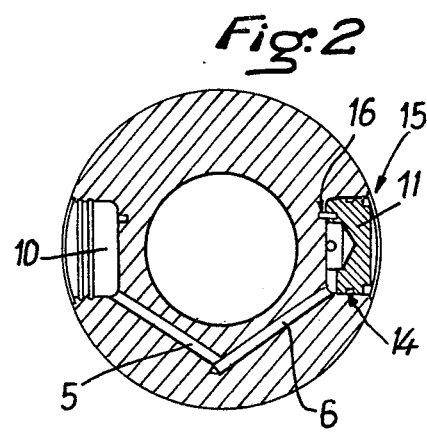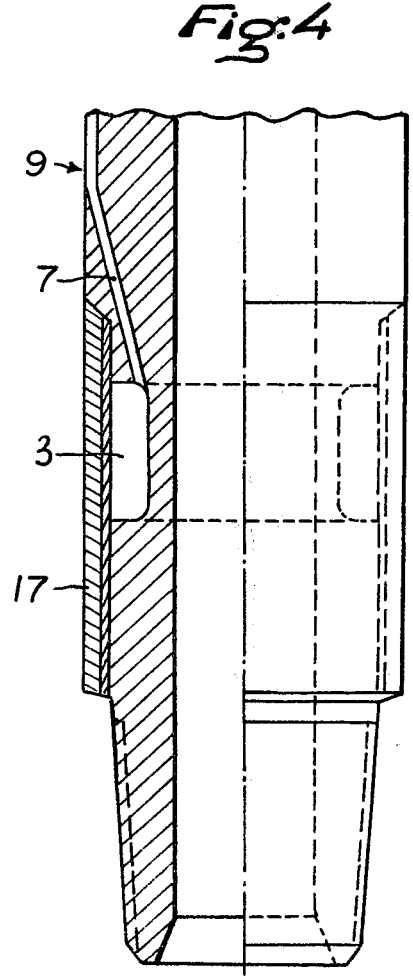

MEASUREMENT OF DRILLING TORQUE

This invention concerns an appliance to measure drilling torque directly on the actual drilling system.

An approximate measurement of a quantity proportional to the drilling torque is usually available to the driller from an appliance measuring the tension of the transmission chain driving the rotary table.

There are other ways of measuring drilling torque, or rather a variable related to it by a more or less definite function. These involve measurements carried out on the engine shaft or on the axis of intermediate shafts between the engine and the rotary table, away from mud splashes and other polluting fluids. Such measurements are taken by dynamometric torsion bars with an active measurement system and rotary transmission without contact, or by torque-meters with a torsion shaft equipped with four wire-resistance gauges, the electrical link between the gauge bridge and measurement unit being provided by rotating collectors or transformers.

One existing device measures the torque on the driving pinion-wheel of the transmission chain, by detecting variations in the magnetic susceptibility of the shaft subject to strain.

But since such methods do not directly involve the drilling system, the measurement they provide of drilling torque always remains an average, overall one.

Direct measurement of drilling torque can be carried out only on the actual drilling system, beneath the rotary table. To avoid the difficulties of transmission through tool joints, measuring appliances must be fitted, not to the actual drilling tool, but to the cylindrical bottom end of the Kelly. To obtain continuous functioning, compatible with operational conditions during drilling, a solution has to be found to the problems of protecting equipment against the impacts to which this part of the drilling system is subject, and of sealing off the appliances hermetically, in a zone that is usually submerged in drilling mud.

The present invention overcomes all these problems.

This new appliance to measure drilling torque comprises at least four strain gauges, the components of a measuring bridge, and an electrical link to a transmission system, and is characterized by the fact that the strain gauges are located on the cylindrical bottom end of the Kelly, inside at least one cavity, that holes are bored in the solid part of the Kelly to provide passages for electrical connections for the measurement bridge and link it to the transmission system, near the upper end, and that the cavity or cavities can be closed hermetically.

In one recommended embodiment, the strain gauges are fixed inside cavities consisting of at least two cylindrical cavities on the same axis, symmetrical in relation to the Kelly axis, and linked by a passage for the electrical connections for the measurement bridge, without any contact between this passage and the axial passage inside the Kelly.

In this embodiment of the invention, the means of closing the cylindrical cavities hermetically consist of steel plugs, the height of which is such that when in place they do not extend beyond the outer perimeter of the Kelly in the zone involved, and the sides of which facing the bases of the cavities contain a concave section leaving a space at the base of the cavity for the stress gauges and electric cable outlets, and also contain at least one pin or half-cavity for a pin, to prevent the plug from turning in the cavity, the cylindrical perimeter of these plugs comprising a groove for a toric seal and a groove to allow an attachment ring to be fitted.

In another embodiment, the strain gauges are fixed to the base of a cavity consisting of a cylindrical recess in the cylindrical bottom end of the Kelly, and a sleeve fits over this part of the Kelly, protecting the equipment, with two toric seals between the sleeve and the Kelly, above and below the recessed section, closing it hermetically.

In another embodiment, the stress gauges are fixed to the base of a cavity consisting of a cylindrical recess in the cylindrical bottom end of the Kelly, and a threaded sleeve screws on to this part of the Kelly, which is threaded to match, to protect the equipment and ensure a hermetic seal.

In another embodiment, the stress gauges are fixed to the base of a cavity consisting of a cylindrical groove, cut in the wall of the axial passage inside the cylindrical bottom end of the Kelly, and a sleeve, threaded on the outside, screws inside this inner passage, which is threaded to match, to protect the equipment and ensure a hermetic seal.

In these various embodiments, the hole bored to provide a passage for electrical connections between the measurement bridge and transmission system opens on to the outer perimeter of the cylindrical bottom end of the Kelly, level with the lower end of a groove, running down the Kelly from the upper end and containing a stainless steel tube to hold the electric cables, the bottom end of this tube being welded to the passage opening.

It will be easier to understand the invention from the following description of some examples of possible embodiments, with reference to the accompanying drawings, in which:

FIG. 1 is a side view, partially in axial section, of a hexagonal drill pipe provided with two cylindrical cavities;

FIG. 2 is a transverse sectional view taken through the drill pipe of FIG. 1 at the level of the bores 5 and 6;

FIG. 4 is a view similar to FIG. 3, showing an embodiment in which the sleeve is screwed in position;

Figure 3:
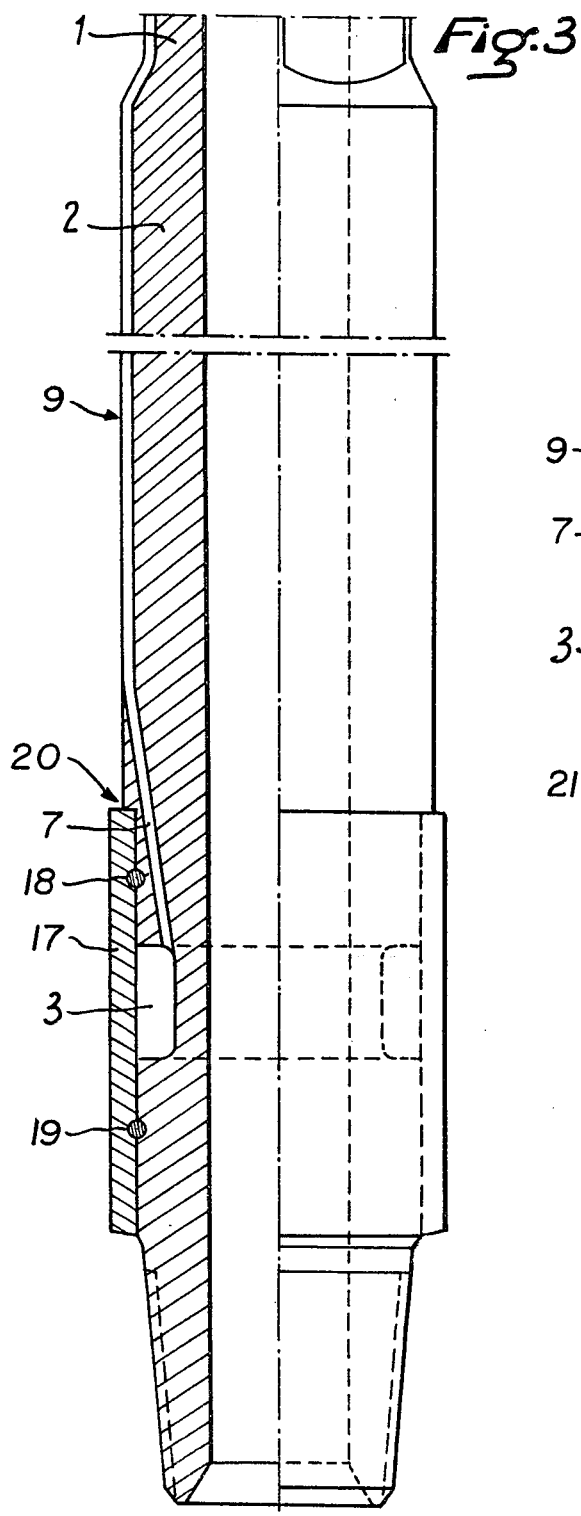
FIG. 3 is a side view of a drill pipe provided with an outside annular recess, a sleeve, and two toric seals, the left-hand side of the figure being shown in axial section.

FIG. 1 shows the lower part of a hexagonal Kelly 1, ending in a cylindrical section 2. This cylindrical end contains two cylindrical cavities 3 and 4 on the same axis and symmetrical in relation to the axis of the Kelly, a passage between the two cavities, consisting of two bored holes 5 and 6 which meet, avoiding the axial passage inside the Kelly, and a passage 7 between the base of one of the two cavities and the outer perimeter of the Kelly, at a point between the cavity and the base of the hexagonal part of the Kelly. The base of each cavity contains a half-cavity for a pin 8, in an off-centre position. The Kelly contains a groove 9 on the outside, linking the end of the passage 7 to the collector (not shown here) near the upper end of the Kelly. A steel tube (not shown here) fits into this groove, and is welded to the outer end of the passage 7, providing a hermetic, impact-proof passage for the cables connecting the measurement bridge with the transmission system.

Figure 6:
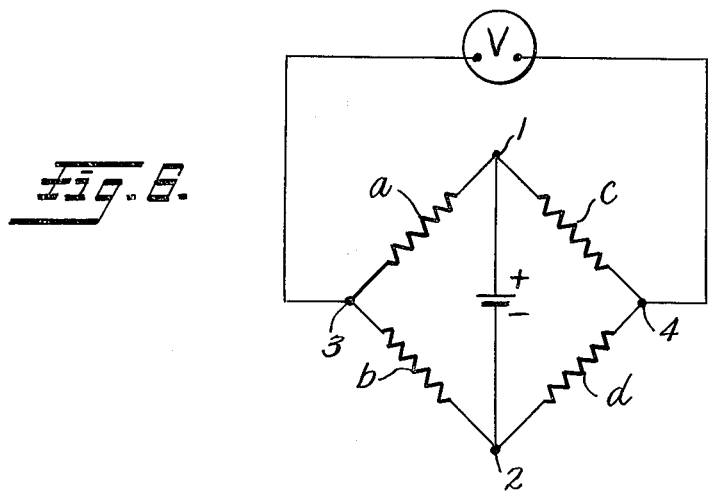
FIG. 6 is a diagrammatic view showing a conventional Wheatstone bridge arrangement.
Figure 7:
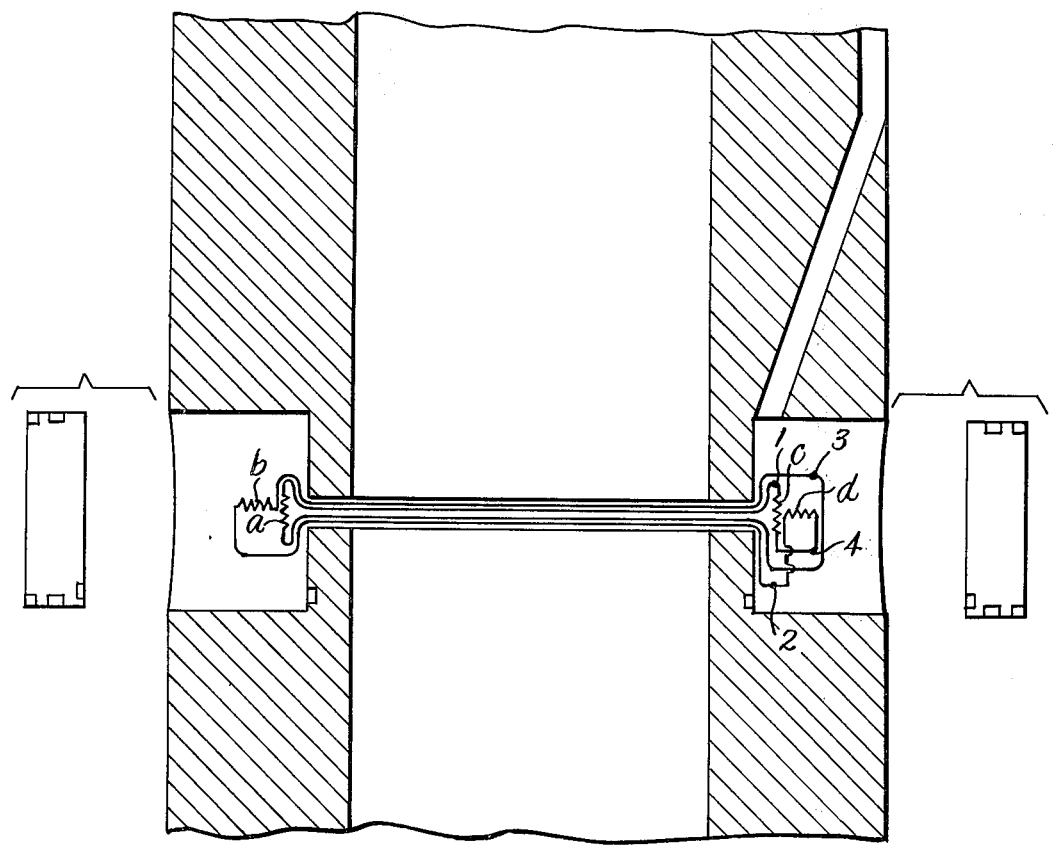
FIG. 7 is a diagrammatic view showing such a bridge connected inside a drill pipe.

The strain gauges (a, b, c, d, shown on FIGS. 6 and 7) are fixed in orthogonal pairs to the base of the cavities 3 and 4, and the electrical conductors (not shown here) linking them with each other and with the transmission system pass along the bored passages 5, 6 and 7, and the tube brazed into the groove 9.

The transmission system (not shown here) at the upper end of the Kelly, protected from impacts and contacts with the drilling mud, consists of a collector, and possibly a radio-wave transmission system.

The cavities 3 and 4 are closed by steel plugs 10 and 11, the height of which is such that when in place they do not extend beyond the outer perimeter of the Kelly in the zone involved. The side of these plugs facing the base of the cavity contains a concave section 12, connected by a groove with the zone from which the connecting passages 5 and 6 leave. This concave section leaves a protected space at the base of the cavity for the stress gauges, electrical connections and cables. Also on the side facing the base of the cavity, each plug contains a milled half-cavity for a pin 13, to prevent the plug from turning. The cylindrical perimeter of these plugs contains a groove 14 for a toric seal (not shown here) and a groove 15, to which an attachment ring (not shown here) can be fixed.

FIG. 2 gives a cross-sectional view of the driving rod, perpendicular to its axis and passing through the axis of the cavities. It shows the position of the two passages 5 and 6 which join up to allow electrical links between the two cavities. One plug 11 is shown in cross-section, illustrating the outline of the concave section and the position of the pin 16.

FIG. 3 shows an embodiment in which the stress gauges (not shown here), are fixed to the base of a cavity consisting of a cylindrical recess 3. A passage 7 connects the base of this recess 3 with the lower end of the groove 9 into which is brazed a stainless steel tube (not shown here), welded to the passage opening. The electrical connection between the strain gauges and collector at the upper end of the Kelly runs along this passage 7 and the tube in the groove 9.

The equipment is protected against impacts by a sleeve 17, screwed on to the rod and extending beyond the recess on each side. Two toric seals 18 and 19 provide a hermetic seal on each side of this sleeve.

The cylindrical bottom end of the Kelly shown in this figure, covered by the sleeve, has been machined down to reduce the overall outer diameter, limiting the outside dimensions of the sleeve and allowing it to be blocked in position against a projecting shoulder 20.

FIG. 4 shows a largely similar embodiment, including the recess 3 and passage 7 linking the base of this recess to the lower end of the groove 9, but in which the equipment inside the cavity is protected, and the cavity closed hermetically, by a sleeve 17 screwed on to the cylindrical bottom end of the Kelly. The outer diameter of the sleeve is the same as that of the cylindrical bottom end of the Kelly which, in the zone covered by the sleeve, has been machined down to reduce the overall outer diameter, and given matching threading. In other embodiments, the cylindrical bottom end of the Kelly is simply given the necessary threading, and the sleeve forms a projecting section on it.

Figure 5:
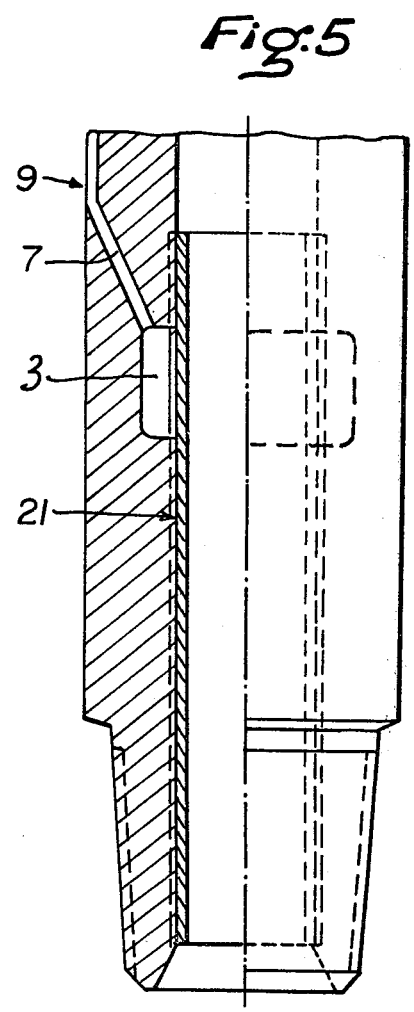
FIG. 5 is a view similar to FIG. 4 showing an embodiment in which the sleeve is screwed in position and the annular recess is internal.

FIg. 5 shows another embodiment, in which the cavity containing the pairs of strain gauges, diametrically opposite each other, consists of a cylindrical recess 3, cut in the wall of the axial passage inside the cylindrical bottom end of the Kelly. The base of the cavity 3 is connected with the groove 9 on the outside of the Kelly by a drilled passage 7.

A sleeve 21, threaded on the outside, is screwed inside the axial passage, which contains matching threading. This protects the equipment and ensures a hermetic seal. A groove of this kind is largely unaffected by impacts, so that the protective sleeve need only be a few millimetres thick, since its main function is to provide a hermetic seal. In the embodiment shown in FIG. 5, the sleeve projects into the axial passage.

This new appliance to measure drilling torque allows it to be detected continuously on the actual drilling system.

Recording the instantaneous value of the drilling torque, with allowance for other parameters, such as the weight acting on the tool and the speed of rotation, provides an effective way of controlling drilling, and allows the means employed to be more accurately adapted to the nature of the ground involved.

This new device solves the problem of measuring torque on any transmission shaft subject to transverse impacts and immersed continuously or intermittently in a corrosive liquid.

What is claimed is:

1. A device to supply a signal representative of the drilling torque comprising a Kelly defining an axial passage for drilling mud, at least one cavity near its lower end, and passage means distinct from said axial passage connecting said cavity to the upper end of said Kelly, a torque-measuring electrical bridge including at least four strain gauges located in diametrically opposed pairs inside said at least one cavity, electrical connections within said passage means which are likewise parts of the measuring bridge and serve to transmit the signal provided by said strain gauges to the top of the Kelly, and means for hermetically closing said at least one cavity.

2. A device, as defined in claim 1, in which said at least one cavity consists of at least two cavities symmetrically positioned in relation to the axis of said Kelly, and connected by said passage means for the electrical connections.

3. A device as claimed in claim 2 in which the means for hermetically closing said at least one cavity comprises a steel plug in each cavity, which lies entirely within the outer perimeter of the Kelly in the zone containing said cavity, while the sides of each plug have a concave section facing the base of the cavity containing that plug, which leaves a space at the base of that cavity for two of said strain gauges and an electrical cable outlet, said plugs and cavities being provided with interfitting pins and pin-receiving recesses which prevent rotation of said plugs in said cavities, the radially outermost surface of each plug being provided with a groove for receiving an annular seal and a groove for receiving an attachment ring.

4. A device as defined in claim 2, in which the cavity in which the strain gauges are located consists of an annular recess in the cylindrical bottom end of the Kelly, the means for hermetically closing the cavity consist of a sleeve fitting over the said bottom end of the drill pipe, and two annular seals located between the sleeve and the Kelly, one of them above and the other below the said recess.

5. A device as defined in claim 2, in which the strain gauges are fixed to the base of a cavity consisting of an annular recess in the cylindrical bottom end of the Kelly and, the means to close hermetically the cavity consist of a threaded sleeve screwed on the bottom end of the Kelly, said bottom end being threaded to mate with the threaded sleeve.

6. A device as defined in claim 2, in which the strain gauges are fixed onto the base of a cavity consisting of an annular recess, cut in the wall of the axial passage inside the cylindrical bottom end of the Kelly, and the means to hermetically close the cavity consist of a sleeve threaded on the outside, screwed inside the inner passage which is threaded to match the threaded sleeve.

7. A device as claimed in claim 1 in which said passage means comprises an external groove running downwardly from the upper part of said Kelly, a stainless steel pipe in said groove holding cables forming part of said electrical connections, and a passage portion leading from a mouth at the lower end of said groove to a cavity, the lower end of said stainless steel pipe being welded to said mouth.

* * * * *